United States Patent [19]

Jabarin

[11] Patent Number: 4,719,143

[45] Date of Patent: Jan. 12, 1988

[54] MULTILAYER POLYETHYLENE ARTICLES

[75] Inventor: Saleh A. Jabarin, Holland, Ohio

[73] Assignee: Owens-Illinois Plastic Products Inc., Toledo, Ohio

[21] Appl. No.: 926,257

[22] Filed: Nov. 3, 1986

[51] Int. Cl.$^4$ ............................................. B32B 7/02
[52] U.S. Cl. .................................. 428/212; 428/349; 428/500; 428/516
[58] Field of Search ............... 428/516, 500, 212, 349

[56] References Cited

U.S. PATENT DOCUMENTS

| | | | |
|---|---|---|---|
| 4,151,318 | 4/1979 | Marshall | 428/212 |
| 4,554,210 | 11/1985 | Long et al. | 428/212 |

FOREIGN PATENT DOCUMENTS

| | | | |
|---|---|---|---|
| 4575 | 1/1977 | Japan | 428/516 |
| 4008682 | 1/1979 | Japan | 428/516 |

OTHER PUBLICATIONS

Modern Plastic encyclopedia 1982-83, p. 76.

Primary Examiner—Edith Buffalow
Attorney, Agent, or Firm—H. G. Bruss

[57] ABSTRACT

A multilayer polyethylene structure is disclosed, which is a laminate of at least two layers of high density polyethylene. In one embodiment, a first layer is high density polyethylene of a density of at least 0.959 grams per cubic centimeter and a melt index of about ten grams per ten minutes or less and is about 80 weight percent of the structure. A second layer of the laminate is high density polyethylene of a density to or less than 0.959 grams per cubic centimeter and a melt index of about ten grams per ten minutes or less and is about 20 weight percent of the structure.

5 Claims, No Drawings

MULTILAYER POLYETHYLENE ARTICLES

BACKGROUND OF THE INVENTION

Articles fabricated from polyethylene polymers, particularly high density polyethylene polymers, are widely accepted in the marketplace for a variety of uses. One such use is the provision of containers fabricated from high density polyethylene, which are used to contain such materials as household cleaners and bleach. Unfortunately, such materials, particularly household bleach, are very corrosive and generally result in environmental stress-cracking of most high density polyethylene resins and thereby degrade the package. This results in the use of specialized, costly high density polyethylene resins for use in such packages.

For this reason, there is a need in the art for an improved polyethylene structure which is particularly well-suited to the fabrication of containers for bleach, which polyethylene structure is resistant to environmental stress-cracking, has good stiffness and top load characteristics for fabrication into containers, is lightweight and is low in cost compared to conventional polyethylene structures.

SUMMARY OF THE INVENTION

The present multilayer polyethylene structure, particularly useful for fabrication into a container for highly stress-crack inducing liquids, provides a multilayer article which shows significant resistance to environmental stress-cracking upon exposure to materials like household bleach as well as good stiffness and top load characteristics when fabricated into containers. The present multilayer polyethylene structure is an intimate laminate of a plurality of layers of different high density polyethylene plastics of varying densities and melt indexes, which laminate can be easily formed by conventional extrusion blow molding technology.

The multilayer polyethylene based laminate structure, according to the present invention, is in its first embodiment a multilayer polyethylene structure including at least a first and second layer of high density polyethylene formed by hot melt coextrusion techniques.

The first layer, typically the outer non-product contacting layer, contains generally about 70 to 90 weight percent and optimally about 80 weight percent of the structure. The first layer is a high density polyethylene having a density of at least 0.959 grams per cubic centimeter and a melt index of 10.0 grams per ten minutes or less. This layer of the laminate provides good stiffness and top load characteristics to the structure when fabricated into containers.

The second layer, which typically forms the inner product contact layer, contains generally about 10 to 30 and optimally about 20 weight percent of the structure. This second layer is formed from a high density polyethylene having a density less than 0.959, preferably about 0.952 to 0.954 or 0.955 grams per cubic centimeter and a melt index of ten grams per ten minutes or less. This second layer of the laminate provides excellent environmental stress-crack resistance when used as a product contacting inner layer when the structure is fabricated into a container for bleach and the like.

In a second embodiment, the multilayer polyethylene structure according to the present invention includes a multilayer polyethylene structure including at least a first and a second layer of high density polyethylene formed by hot melt coextrusion techniques.

The first layer, or outer layer, contains generally about 70 to 90 and optimally about 80 weight percent of the structure and is composed of a blend of:

(a) generally about 60 to 80 and optimally about 70 weight percent of high density polyethylene having a density of at least 0.959 grams per cubic centimeter (generally about 0.959 or 0.960 up to 0.963 or 0.964) and a melt index of ten grams per ten minutes or less and (b) generally about 20 to 40 and optimally about 30 weight percent of a blended high density polyethylene material including (1) about 80 weight percent of a high density polyethylene having a density of at least 0.959 grams per cubic centimeter and a melt index of ten grams per ten minutes or less and (2) generally about 10 to 30 and optimally about 20 weight percent of a high density polyethylene having a density less than 0.959 and preferably as low as 0.951 up to as high as 0.954 or 0.957 grams per cubic centimeter and a melt index of ten grams per ten minutes or less.

The second layer contains generally about 10 to 30 and optimally about 20 weight percent of the structure and is composed of high density polyethylene having a density less than 0.959 grams per cubic centimeter and a melt index of ten grams per ten minutes or less.

As in the first embodiment of the invention, the first layer provides good stiffness and top load when the structure is fabricated into a container.

The second layer provides an excellent product contact layer showing excellent environmental stress-crack resistance when fabricated into a container for materials like bleach. This second embodiment, which uses a blended first layer as set forth above, allows for the maximum utilization of scrap material. Such scrap is typically generated when extrusion blow molded containers are formed. The scrap is recycled into the first layer, for instance, preferably as an addition of about 30 weight percent to a virgin high density polyethylene which comprises about 70 weight percent of the first layer. I have discovered that the scrap material can be included without significant adverse effect on the overall container performance and particularly its inclusion does not degrade the performance characteristics of the container.

The containers fabricated from the laminate structures of either embodiment of this invention are lighter in weight than present containers and thus less costly, show no significant reduction in required performance properties and can accommodate the inclusion of manufacturing scrap for maximum economic benefit.

DETAILED DESCRIPTION OF THE INVENTION

The multilayer polyethylene structure, according to the present invention, has two embodiments. In the first embodiment, a multilayer polyethylene structure including at least a first and a second layer of different high density polyethylenes is formed by conventional hot melt coextrusion techniques.

The first layer, or outer layer, contains about 80 weight percent of the structure and includes a high density polyethylene having a density of at least 0.959 grams per cubic centimeter and a melt index of 10.0 grams per ten minutes or less. This layer of the laminate provides good stiffness and top load to the structure when fabricated into containers.

The second layer, or inner product contacting layer, contains about 20 weight percent of the structure and includes a high density polyethylene having a density less than 0.959 grams per cubic centimeter (generally about 0.951 to 0.956 or 0.957) and a melt index of ten grams per ten minutes or less. This second layer of the laminate provides excellent environmental stress-crack resistance when used as a product contacting inner layer when the structure is fabricated into a container for bleach and the like.

For the structure of the first embodiment, according to the present invention, the high density polyethylene in both layers may be filled with conventional fillers, preferably stiffness-enhancing fillers like calcium carbonate. Alternatively and less preferably, other conventional non-stiffening fillers, such as titanium dioxide, may be used.

A preferred high density polyethylene material for use in the first layer is one manufactured by Phillips Chemical Company, a subsidiary of Phillips Petroleum Company, and sold under the product designation EHM 6003. This material has the following physical characteristics which are exemplary of a preferred material for the first layer.

A density under ASTM D1505 of 0.963 grams per cubic centimeter; a melt index under ASTM D1238 (2.16 kg) of 0.3 gram per ten minutes; an environmental stress-cracking resistance under condition A, ASTM D1693 under F-50,H test of between about 15 and 20; a tensile strength at yield, under two inches per minute rate under ASTM D638 of 4400 psi; an elongation, at two inches per minute, under ASTM D638 of at least 600 percent; and a flexural modulus under ASTM D790 of 240 M psi.

Other suitable materials are commercially available but the above-referred to resin is preferred according to the present invention.

With respect to the high density polyethylene material having a density less than 0.959 grams per cubic centimeter and a melt index of ten grams per ten minute or less which forms the second, or inside layer, a preferred material is manufactured by the USI Chemicals, subsidiary of National Distillers & Chemical Corporation and marketed under the product designation LC732 having the following physical properties:

A density under ASTM D1505 of 0.953 grams per cubic centimeter; a melt index of 0.28 gram per ten minutes under ASTM D1238, a tensile strength of 3850 psi under ASTM D628 Type 4 specimen at two inches per minute; an elongation at break point of 850 percent under ASTM D638 at two inches per minute; a flexural stiffness of 120,000 psi under ASTM 747; a torsional stiffness of 110,000 psi under ASTM D1043; a one percent secant modulus of 115,000 psi under ASTM D638; a Vicat softening point of 126° C. under ASTM 1525 and a low temperature brittleness (F−50) of −76° C. as measured by ASTM D746.

Obviously, other commercial materials are available which would be suitable but the above described USI high density polyethylene is preferred due to its excellent environmental stress-crack resistance good flow characteristics and ability to be laminated to the first layer.

Similarly, the above-referred to Phillips Chemical Company high density polyethylene, when used according to the present invention, has shown excellent stiffness when laminated to the stress-crack resistance layer of the high density polyethylene having a density equal to or less than 0.959 grams per cubic centimeter.

Obviously, since the multilayer structure, according to the present invention, is preferably fabricated into containers for holding such stress-crack inducing materials as household bleach and cleaners, it is of course preferred that the second layer of the environmentally stress-crack resistant high density polyethylene of density equal to or less than 0.959 be on the inside product contacting layer with the stiffness enhancing first layer weight portion of the multilayer structure of density of 0.959 or greater on the exterior surface.

Most preferably, the second or inner layer of material, which comprises preferably about 20 weight percent of the structure, will have a density in the range of as low as about 0.940 up to 0.957 or 0.958. The above referred to USI material designated by the tradename LC732 shows a good flow rate, acceptable stiffness and very good environmental stress-crack resistance and according to my discovery can be cast into multilayer high density polyethylene structures using conventional extrusion blow molding technology.

The second embodiment of the present invention relates to a multilayer high density polyethylene structure which utilizes to the greatest extent possible scrap generated during the fabrication of multilayer high density polyethylene containers so that waste is minimized and yet without sacrificing the environmental stress-crack resistance or stiffness (and thus top-load) of any resultant containers formed from the multilayer structure. The multilayer polyethylene structure according to the second embodiment of the invention comprises a multilayer polyethylene structure, according to the present invention, including at least a first and a second layer of high density polyethylene formed by hot melt coextrusion techniques.

The first layer contains preferably about 80 weight percent of the structure and is composed of a blend of:

(a) preferably about 70 weight percent of high density polyethylene having a density of at least 0.959 grams per cubic centimeter and a melt index of ten grams per ten minutes or less and (b) about 30 weight percent of a blended high density polyethylene material including (1) about 80 weight percent of a high density polyethylene having a density of at least 0.959 grams per cubic centimeter and a melt index of ten grams per ten minutes or less and preferably (2) about 20 weight percent of a high density polyethylene having a density less than 0.959 grams per cubic centimeter and a melt index of ten grams per ten minutes or less.

The second layer contains preferably about 20 weight percent of the structure and is composed of high density polyethylene having a density less than 0.959 grams per cubic centimeter and a melt index of ten grams per ten minutes or less.

The above 30 weight percent blended high density polyethylene material is derived from container scrap which is generated during normal extrusion blow molding of container structures and is used to increase manufacturing efficiencies without adversely affecting the properties of the container.

The following examples are set forth to illustrate the principle in practice of the present invention to those skilled in the art and specifically to illustrate the significantly improved weight and performance characteristics of the multilayer high density polyethylene structure prepared according to the present invention when compared to high density polyethylene monolithic containers formed by identical extrusion blow molding technology.

Monolayer (prior art) and colayer container (made according to the invention) tests and evaluations were conducted. The tests were carried out on a CE-4 type (wheel type) high speed continuous extrusion blow molding machine equipped with dual extruders. The dual extruders fed a colayer head designed to deliver two distinct, separate layers of polyethylene, fusing these layers together into a single parison. This parison was blow molded into 128 oz. handled containers weighing approximately 98 grams each.

The tests demonstrated the lightweighting capability of a colayer system whose exterior layer is made up of a high density polyethylene with a density of at least 0.959 grams per cubic centimeter and a melt index of 10 grams per ten minutes or less, and whose interior layer is made up of a high density polyethylene with a density less than 0.959 grams per cubic centimeter and a melt index of 10 grams per ten minutes or less. The exterior layer provides good stiffness and top load characteristics while the interior provides excellent environmental stress-crack resistance when the above structures are combined and fabricated into containers for bleach or other conventional household and chemical products.

The monolayer (prior art) and colayer containers were subjected to physical performance, mechanical performance and environmental stress-crack resistance, with the following results:

1. The colayer containers exhibited a 8.36% improvement in vertical load (top load) performance over the monolayer (prior art) container system. This was supported by a 16.7% increase in flexural stiffness over the monolayer container system.

2. Even though 80% of the colayer container system was made up of a high density polyethylene with a density of at least 0.959 grams per cubic centimeter, the containers still maintained equivalent impact resistance as the monolayer container system which was made up of high density polyethylene with a density equal to or less than 0.959 grams per cubic centimeter.

3. The colayer container system which employed a high density polyethylene with a density less than 0.959 grams per cubic centimeter at 20% of the container weight for stress-crack resistance was still able to maintain acceptable stress-crack resistance equivalent to the monolayer system employing 100% of the high density equal toor less than 0.959 grams per cubic centimeter.

The results indicate that an 8% lightweighting capability of the colayer system over the monolayer system can be achieved, while still maintaining the required physical performance and stress-crack resistance of a monolayer container manufactured from high density polyethylene with a density of 0.959 (or more) grams per cubic centimeter, at conventional container gram weights.

The detailed results are shown in the tables that follow:

TABLE 1

COMPOSITIONS FOR CONTROL AND COLAYER CONTAINERS:

A. Monolayer System (Control Containers)

| | | |
|---|---|---|
| U.S.I. LC732-02 Copolymer HDPE | 70% | |
| Nortech Blue White Color Concentrate | 4% | (4#'s/100#'s Resin) |
| Regrind: | | |
| U.S.I. LC732-02 | 30% | |
| Nortech Colorant | | |

B. Colayer System (Containers Made According to the Present Invention)

Exterior Layer (80% of Container Weight)

| | | |
|---|---|---|
| U.S.I. LB747-02 Homopolymer HDPE | 70% | |
| Nortech Blue White Color Concentrate | 5.5% | (5.5#'s/100#'s Resin) |
| Regrind: | | |
| 80% U.S.I. LB747-02 | 30% | |
| 20% U.S.I. LC732-02 | | |
| 5% Nortech Colorant | | |

Interior Layer (20% of Container Weight)

| | |
|---|---|
| U.S.I. LC732-02 Copolymer HDPE | 100% |

TABLE 2

MATERIAL SPECIFICATIONS FOR HIGH DENSITY POLYETHYLENES

1. U.S.I. LB747-02 Homopolymer HDPE

General Specifications:
- Density: 0.959–0.965 g/cc
- Melt Index: 0.50–0.85 g/10 Min.
- Viscosity: 3.00–3.45 Kpoise (1000 sec$^{-1}$ at 190° C.)

Test results on polyethylene used in tests:
- 0.961 g/cc Density
- 0.64 g/10 Min.
- 3.08 Kpoise (1000 sec$^{-1}$ at 190° C.)

2. U.S.I. LC732-02 Copolymer HDPE

General Specifications:
- Density: 0.952–0.955 g/cc
- Melt Index: 0.20–0.35 g/10 Min.
- Viscosity: 3.65–3.85 Kpoise (1000 sec$^{-1}$ at 190° C.)

Test results on polyethylene used in tests:
- 0.954 g/cc Density
- 0.26 g/10 Min.
- 3.65 Kpoise (1000 sec$^{-1}$ at 190° C.)

TABLE 3

MACHINE CONDITIONS

A. Monolayer System (Control Containers)

Sterling 4½" Extruder - Copolymer HDPE/Color Concentrate/Regrind

| Temperature (°F.) | 1 | 2 | 3 | 4 | 5 | 6 |
|---|---|---|---|---|---|---|
| Zone Settings | 340 | 400 | 400 | 400 | 400 | 400 |
| Zone Actuals | 341 | 400 | 401 | 400 | 401 | 395 |

Melt Temperature: 439° F.

| Die Head | 1 | 2 | 3 | Head | Bushing | Screen Changer |
|---|---|---|---|---|---|---|
| Temperature (°F.) | | | | | | |
| Zone Settings | 375 | 350 | 350 | 350 | 375 | 350 |
| Zone Actuals | 376 | 354 | 362 | 362 | 377 | 350 |

B. Colayer System (Containers Made According to Present Invention)

Sterling 4½" Extruder - Homopolymer HDPE/Color Concentrate/Regrind

| Temperature (°F.) | 1 | 2 | 3 | 4 | 5 | 6 |
|---|---|---|---|---|---|---|
| Zone Settings | 340 | 400 | 400 | 400 | 400 | 410 |
| Zone Actuals | 356 | 405 | 399 | 396 | 400 | 412 |

Wilmington 3½" Extruder - Copolymer HDPE

| | 1 | 2 | 3 | 4 | Adaptor | Die |
|---|---|---|---|---|---|---|
| Temperature (°F.) | | | | | | |
| Zone Settings | 350 | 350 | 350 | 350 | 350 | 350 |

TABLE 3-continued

| MACHINE CONDITIONS | | | | | | |
|---|---|---|---|---|---|---|
| Zone Actuals | 352 | 350 | 349 | 353 | 365 | 365 |

| Die Head | 1 | 2 | 3 | Head | Bushing | Screen Changer |
|---|---|---|---|---|---|---|
| Temperature (°F.) | | | | | | |
| Zone Settings | 350 | 350 | 350 | 350 | 375 | 350 |
| Zone Actuals | 356 | 354 | 361 | 362 | 377 | 350 |
| Melt Temperature: 434° F. | | | | | | |

TABLE 4

PHYSICAL PROPERTIES OF MOLDED CONTAINERS

|  | Monolayer (Control) System |
|---|---|
| 1. Vertical Load (Top Load) | |
| TMI Topload Apparatus | |
| 1"/Min. Applied Load | |
| Read at ¼" Container | |
| Deflection | |
| Nominal Fill with 100° F. H₂O | |

|  | Monolayer (Control) System | Colayer (Present Invention) System |
|---|---|---|
| Containers Tested | 24 | 24 |
| Average Weight | 97.5 Grams | 98.4 Grams |
| Average Topload | 101.7 Pounds | 110.2 Pounds |
| σ | 6.7 | 4.8 |
| 2. Bottom Drop Impact | | |
| Drop Impact Apparatus | | |
| Set for 2 Ft. Drop (Container Upright) | | |
| Nominal Fill with 70° F. H₂O | | |

|  | | Colayer System |
|---|---|---|
| Containers Tested | 12 | 12 |
| Average Weight | 97.5 Grams | 98.4 Grams |
| Drop Results | 1 of 12 Failed (Cavity #1) | 0 of 12 Failed |
| 3. Side Drop Impact | | |
| Drop Impact Apparatus | | |
| Set for 3 Ft. Drop (Container on Side) | | |
| Nominal Fill with 70° F. H₂O | | |

|  | | Colayer System |
|---|---|---|
| Containers Tested | 12 | 12 |
| Average Weight | 97.5 Grams | 98.4 Grams |
| Drop Results | 1 of 12 Failed (Cavity #1) | 2 of 12 Failed (Cavity #1) (Cavity #9) |

TABLE 5

MECHANICAL PROPERTIES OF MOLDED CONTAINERS

|  | Monolayer (Control) System | | Colayer (Present Invention) System | |
|---|---|---|---|---|
|  | Axial | Hoop | Axial | Hoop |
| Elastic Modulus, x̄ | 115 | 119 | 125 | 140 |
| Kpsi σ | 19 | 12 | 9 | 16 |
| Yield Stress, x̄ | 3.8 | 3.8 | 3.8 | 4.3 |
| Kpsi σ | 0.5 | 0.6 | 0.2 | 0.6 |
| Yield Strain, x̄ | 8.7 | 8.1 | 8.7 | 7.6 |
| % σ | 0.3 | 0.2 | 0.5 | 0.1 |
| Ultimate Strength, x̄ | 6.1 | 6.2 | 5.4 | 5.6 |
| Kpsi σ | 0.4 | 0.8 | 0.3 | 0.8 |
| Ultimate Elongation x̄ | 734 | 728 | 772 | 745 |
| % σ | 34 | 29 | 42 | 57 |
| Flexural Stiffness, x̄ | 90 | — | 105 | — |
| Kpsi σ | 4 | — | 4 | — |

TABLE 6

ENVIRONMENTAL STRESS-CRACK RESISTANCE OF MOLDED CONTAINERS

Dynamic Compression Load on Containers of ¼ Inch Deflection
Test Environment Temperature 120° F.
Nominal Fill with Liquid Chlorine Bleach

|  | Monolayer (Control) System | Colayer System |
|---|---|---|
| Containers Tested | 20 | 20 |
| Average Weights | 97.6 Grams | 98.5 Grams |
| 15 Day Test Results | 0 of 20 Failed | 0 of 20 Failed |

*50% Failure After 14 Days Would Be Considered Passing
**After 24 Days Neither Variable Reached F50.

What is claimed is:

1. A multilayer polyethylene structure comprising at least a first and a second layer of high density polyethylene wherein,
    the said first layer containing about 80 weight percent of the structure and includes a high density polyethylene having a density of at least about 0.959 grams per cubic centimeter and a melt index of about 10.0 grams per ten minutes or less, and
    said second layer containing about 20 weight percent of the structure and including a high density polyethylene having a density less than 0.959 grams per cubic centimeter and a melt index of about ten grams per ten minutes or less.

2. A multilayer polyethylene structure comprising at least the first and the second layer of high density polyethylene wherein,
    said first layer contains about 80 weight percent of the structure and is composed of
        (a) about 70 weight percent of high density polyethylene having a density of at least 0.959 grams per cubic centimeter and a melt index of about ten grams per ten minutes or less and
        (b) about 30 weight percent of a blended high density polyethylene material including (1) about 80 weight percent of high density polyethylene having a density of at least 0.959 grams per cubic centimeter and a melt index of about ten grams per ten minutes or less and (2) 20 weight percent of a high density polyethylene having a density less than 0.959 grams per cubic centimeter and a melt index of about ten grams per ten minutes or less; and
    said second layer contains about 20 weight percent of the structure and is composed of high density polyethylene having a density less than 0.959 grams per cubic centimeter and a melt index of about ten grams per ten minutes or less.

3. A multilayer polyethylene structure comprising a first layer that is about 70 to 90 weight percent of the structure and comprises a high density polyethylene having a density of at least about 0.959 g/cc and a melt index of about 10 grams per 10 minutes or less, and a second layer that is about 10 to 30 weight percent of the structure and comprises a blend of (a) about 60 to 80 weight percent of a high density polyethylene having a density of at least about 0.959 g/cc and a melt index of about 10 minutes or less, and (b) about 20 to 40 weight percent of a high density polyethylene having a density of less than 0.959 and a melt index of 10 minutes or less.

4. A structure as defined in claim 3 in which the polyethylene of the first layer has a density of about 0.963 g/cc and a melt index of about 0.3 grams per 10 minutes, and the polyethylene of the second layer has a density of about 0.953 g/cc and a melt index of about 0.28 gram per 10 minutes.

5. A multilayer polyethylene structure comprising at least the first and the second layer of high density polyethylene wherein, said first layer contains about 70 to 90 weight percent of the structure and is composed of
  (a) about 60 to 80 weight percent of high density polyethylene having a density of at least 0.959 grams per cubic centimeter and a melt index of about ten grams per ten minutes or less and
  (b) about 20 to 40 weight percent of a blended high density polyethylene material including (1) about 70 to 90 weight percent of high density polyethylene having a density of at least 0.959 grams per cubic centimeter and a melt index of about ten grams per ten minutes or less and (2) 10 to 30 weight percent of a high density polyethylene having a density less than 0.959 grams per cubic centimeter and a melt index of about ten grams per ten minutes or less; and said second layer contains about 10 to 30 weight percent of the structure and is composed of high density polyethylene having a density less than 0.959 grams per cubic centimeter and a melt index of about ten grams per ten minutes or less.

* * * * *